July 1, 1924.
C. E. DAVIS
1,499,912
APPARATUS FOR HANDLING ORE AND THE LIKE
Filed Feb. 6, 1922  2 Sheets-Sheet 1
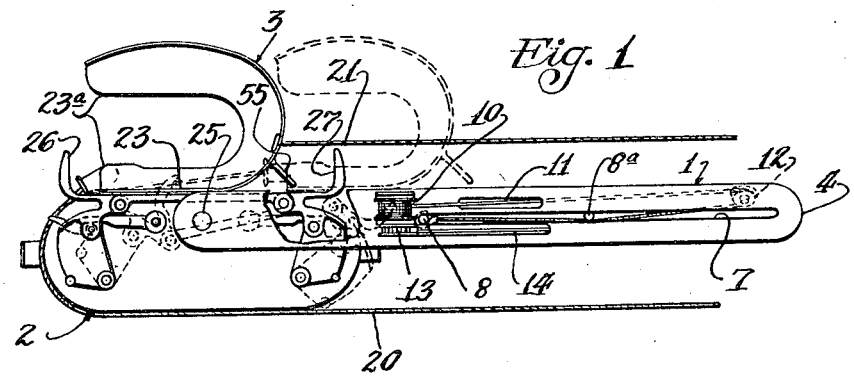
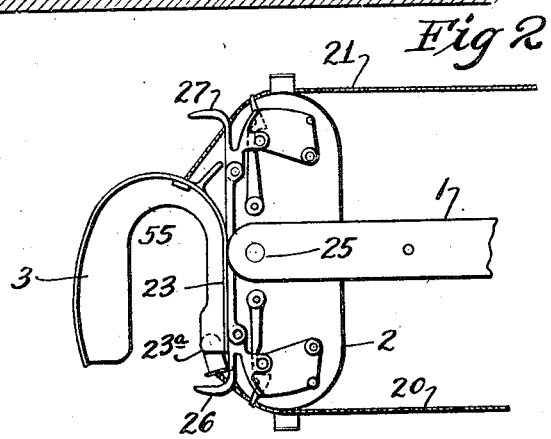
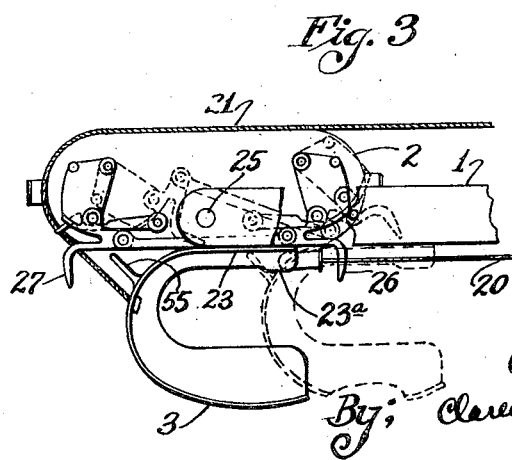
Inventor:
Charles E. Davis
By: Clarence F. Poole
Attorney

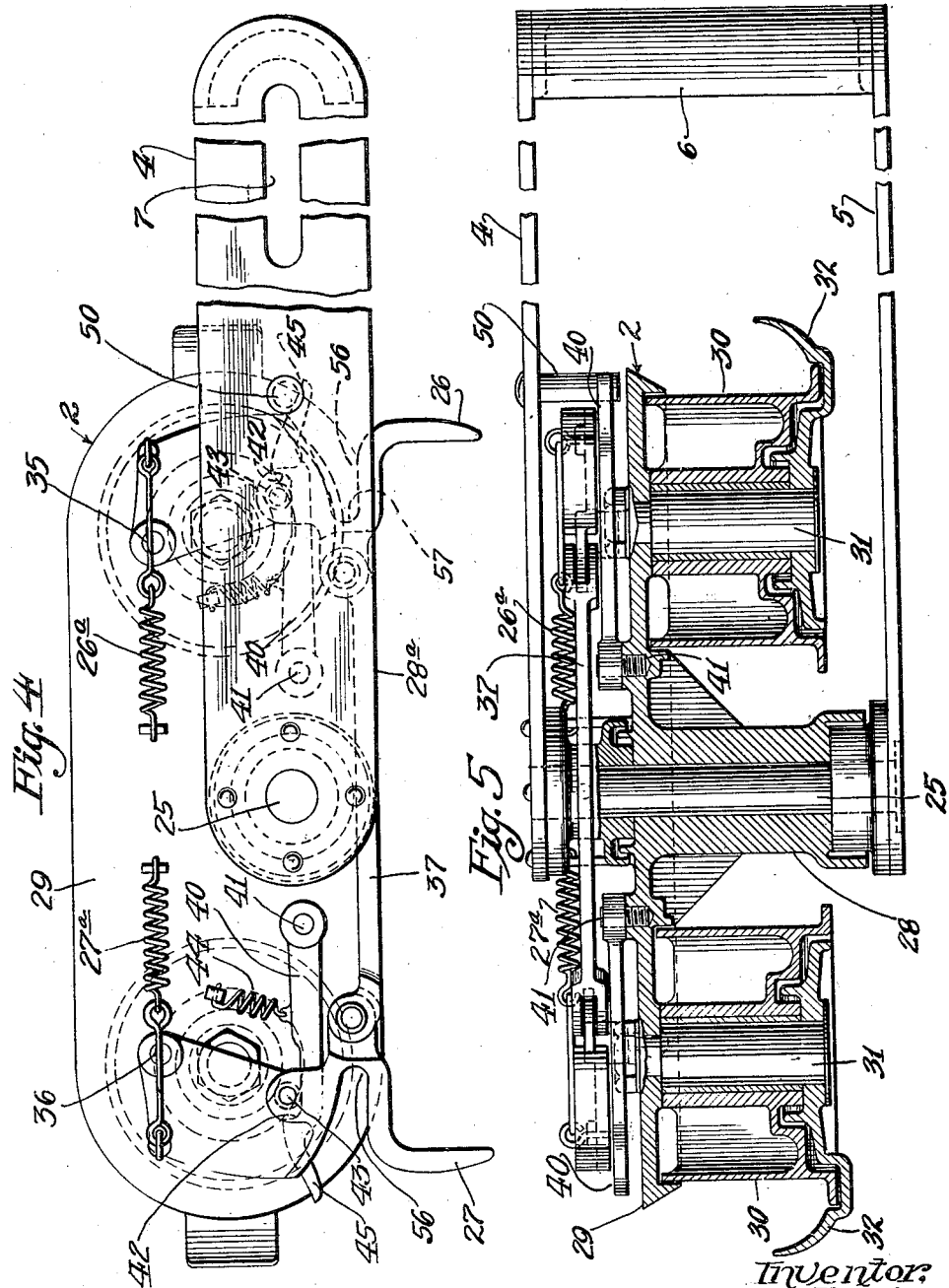

Patented July 1, 1924.

1,499,912

UNITED STATES PATENT OFFICE.

CHARLES E. DAVIS, OF CHICAGO, ILLINOIS, ASSIGNOR TO GOODMAN MANUFACTURING COMPANY, OF CHICAGO, ILLINOIS, A CORPORATION OF ILLINOIS.

APPARATUS FOR HANDLING ORE AND THE LIKE.

Application filed February 6, 1922. Serial No. 534,324.

*To all whom it may concern:*

Be it known that I, CHARLES E. DAVIS, a citizen of the United States, residing at Chicago, in the county of Cook and State of Illinois, have invented an Improvement in Apparatus for Handling Ore and the like, of which the following is a specification.

This invention relates to improvements in apparatus for handling ore and the like and has for its principal object to provide a scraping apparatus for gathering and transporting loose material from one place to another. A further object is to provide a scraping apparatus of the class described in which the scraper may be turned about a fixed vertical axis and within a relatively short radius during the gathering of the material to be transported.

In a copending application Serial No. 382,696, filed May 20, 1920, I have shown and described a scraping apparatus comprising a draft operated scraper adapted to have lateral engagement with a supporting frame, whereby the scraper is moved about the frame and positively directed into the material to be loaded. The frame is arranged so as to be advanced intermittently towards the material to be gathered. In the apparatus shown in the present application, a somewhat similar principle is employed, in which the scraper has lateral engagement with a pivotally mounted portion of the frame, which portion co-acts with and swings the scraper so as to change its course of direction circumferentially about a relatively short radius.

My invention may best be understood by reference to the accompanying drawings, in which—

Figure 1 is a top plan view showing the apparatus installed in a mine.

Fig. 2 is a fragmentary view of the apparatus shown in Fig. 1 with the turning and scraping mechanism in a second position.

Fig. 3 is a view similar to Fig. 2 with the turning and scraping mechanism in a third position.

Fig. 4 is an enlarged detail view of the frame and turning device with a portion of the frame broken away.

Fig. 5 is a side view of the apparatus shown in Fig. 4 with a portion thereof shown in section.

Referring now to details of the embodiment of my invention illustrated in the drawings, the apparatus comprises a supporting frame 1 having a pivotally mounted frame member 2 at its forward end adapted to be engaged by a draft operated scraper 3. The frame 1 preferably comprises a pair of parallel beams 4 and 5 spaced vertically apart by suitable means such as a connecting member 6. A longitudinal slot 7, 7, is formed throughout a large portion of the length of both beams 4 and 5 adjacent the rear end thereof suitable for receiving supporting and guide means such as a pair of vertically disposed mine jacks 8 and 8ª, which are adapted to be inserted in spaced relation in the slotted portion of the beams so as to support the beams against lateral movement with respect to the mine floor, and yet permitting longitudinal movement of the frame 1, as shown in the plan view in Fig. 1. The frame is adapted to be advanced as the loading operation proceeds by suitable means such as a winch or a cable drum 10 mounted on the upper beam and having a rearwardly extending cable 11 trained about a pulley 12 and from thence forwardly to engage one of the supporting jacks such as the forward jack 8. The cable drum 10 may be operated by any suitable means such as a ratchet device 13 of any suitable construction having an operating handle 14 associated therewith. It will be understood, however, that any other suitable means for intermittently advancing the frame may be employed, such as means co-acting with the scraper for automatically advancing the frame, as disclosed in my copending application Serial No. 506,712, filed October 10, 1921.

The scraper 3 is provided with a head rope 20 and a tail rope 21 each operatively connected to a hoisting engine located beyond the point to which the material is to be carried. The initial loading position of the scraper is at one side of the loading frame with its open end facing forwardly therefrom as shown in dotted lines in Fig. 1. In this position its inner side 23, which preferably has a straight bearing portion as indicated, is in lateral engagement with the swinging frame member 2 mounted eccentrically on a pivotal stud 25 between the upper and lower beams 4 and 5 of the frame. This swinging frame member 2 is elongated in shape, being substantially longer than the scraper 3, and comprises a hub 28 having bearing on the pivotal stud 25 aforesaid and integral with a horizontally disposed plate 29. A pair of vertically disposed rollers 30 are mounted on suitable studs 31, 31, on opposite ends of said plate in position to engage the draft ropes 20 and 21 to provide an anti-friction bearing therefor. A pair of longitudinally extending hooks 32, 32, are carried on the bottom ends of the studs 31, 31, and extend longitudinally from underneath the rollers 30, 30, to engage the draft ropes and maintain them from dropping off. A pair of locking arms 26 and 27 are adapted normally to project laterally from one side 28$^a$ of said rocking member, against which the scraper 3 has lateral bearing. Said locking arms are spaced apart so as to include one side of the scraper and retain the latter in position against the side 28$^a$ of rocking member 2, so that both scraper and rocking member 2 will be swung as a unit about the pivot stud 25. It will be noted that the swinging member 2 is pivoted eccentrically nearer the bearing side 28$^a$, so that the scraper may be moved circumferentially about a very short radius.

Means are provided for locking the rocking member 2 with respect to the frame in two positions, namely, when the bearing face 28$^a$ thereof is in longitudinal alignment with one side of the frame and the open end of the scraper is faced forwardly as shown in Fig. 1, and again when the rocking member is swung about its axis and the bearing face 28$^a$ is in alignment with the opposite side of the frame 1 and the open end of the scraper is faced rearwardly as shown in Fig. 3. The locking member referred to is adapted to be actuated by the scraper as it is moved and comes into contact with the locking arms 26 and 27. This locking mechanism is shown in detail in Figs. 4 and 5 and diagrammatically in Figs. 1, 2 and 3, which illustrate the various positions of the locking mechanism as it is actuated by the movement of the scraper. The locking arms 26 and 27 are mounted on pivot pins 35 and 36, respectively, carried on the plate 29. Said arms are operatively connected together by a cross member 37, and are normally maintained in substantially parallel relation by tension springs 26$^a$ and 27$^a$. The construction of the locking arms 26 and 27 and associated parts being alike, a description of one will suffice for an understanding of both and similar parts will be numbered alike. A lever arm 40 is pivotally mounted on a pin 41 carried by the frame 29. This arm 40 normally extends longitudinally of the frame 29 and is provided with a transversely disposed catch or detent 42 adapted to engage a pin 43 carried by the arm 27 to restrain movement of the latter in a direction endwise of the swinging member 2. The lever arm 40 is normally maintained in engagement with pin 43 by means of a tension spring 44. A limited movement is preferably permitted between the pin 43 and detent 42 so as to allow the locking arms 26 and 27 to swing longitudinally a limited distance before one or the other of the detents 42 become engaged with its respective pin 43. The lever arm 40 has an end 45 projecting longitudinally beyond the detent 42 in position to engage a suitable pin or stop 50 mounted on the frame. This pin or stop serves to limit the pivotal movement of the whole rocking member 2 to an angle of approximately 180 degrees, although manifestly the angular movement of the scraper and swinging member may be decreased by providing two stops spaced circumferentially as desired.

The operation of the locking mechanism is as follows: When the scraper is moved rearwardly to a starting position indicated in dotted lines in Fig. 1, it is engaged with the bearing side 28$^a$ of rocking member 2, and a projection 55 on the rear end of the scraper engages with the arm 27. The levers 26 and 27 are both locked by detents 42, 42. Movement of the rocking member 2 is continued until the projection 45 on the lever 40 associated with said locking arm 27 comes into engagement with and is stopped by the pin 50 carried on the frame 1. Movement of the rocking frame 2 is thereby arrested but as the rearward movement of the scraper continues, the pressure on the outer end of the arm 27 is sufficient to release the pin 43 from detent 42 and allows arm 27 to swing inwardly into position shown in Fig. 1. This pivotal movement of the arm 27 carries the open slot 56 thereof into engagement with the pin 50 until the movement of said arm is stopped at the end 57 of slot 56. In this position, the swinging frame 2 is positively locked against movement with respect to the frame 1. Now when the movement of the scraper is reversed in the usual manner by releasing the tail rope 21 and pulling on the head rope 20, the scraper is moved forwardly until the forward edge 23$^a$ engages the locking arm 26 and moves it about its center. Locking arm 26 is connected by cross member 37 to its companion locking arm 27, as aforesaid, so both of said locking arms resume their normal positions shown in full lines in Fig. 1. Continued pivotal movement of the locking arm 26 is restrained by the detent 42 which engages the pin 43 as already described, so that continued pull on the tail rope will swing the entire rocking arm 2 about its axis on stud 25 through the position shown in Fig. 2 until it reaches the position shown in Figs. 3 and 4, in which the end 45 of lever 40 engages the stop 50 on the fixed frame 1. Thereupon continued forward movement of the scraper will unlock the pin 43 from detent 42 as before described in connection with the operation of locking arm 27, allowing arm 26 to be moved downwardly and out of the path of the scraper as shown in dotted lines in Fig. 3 and at the same time locking the swinging frame 2 with respect to the moving frame 1.

From the above description, it will now be clear that the scraper during its reciprocable movement is adapted to co-act with the swinging frame 2 so as to be turned and change its course of direction circumferentially about a relatively short radius. The apparatus is particularly adapted for turning the scraper during its loading operation, although it is obvious that it might be used at any point in the path of movement of the scraper so as to change the direction of movement thereof.

When the apparatus is used for loading, the frame 1 is advanced toward the material to be loaded by means of the winch 10 and the draft device 11 as already described. The frame 2 may be set in various positions or angles with respect to the material to be moved by fixing the guiding means such as the jacks 8 and 8ª as desired.

Although I have shown and described one form in which my invention may be embodied, it will be understood that many other means may be employed for accomplishing the same results, without departing from the spirit and scope of my invention. I do not therefore wish to be understood as limiting myself to the specific construction illustrated herein excepting as specifically limited in the appended claims.

I claim as my invention:

1. In an apparatus of the class described, in combination with a reciprocable draft-operated scraper, a frame having lateral supporting means, an elongated turning member having pivotal connection intermediate its ends with said frame, and adapted to afford bearing at one side thereof for said scraper, said pivotal connection being eccentric of the lateral sides of said turning member, and nearer the bearing side thereof.

2. In an apparatus of the class described, in combination with a frame having lateral supporting means, an elongated turning member pivotally mounted on said frame, a reciprocable draft-operated scraper adapted to have lateral engagement with said turning member and to turn therewith during the movement of said scraper about said frame, and anti-friction rollers mounted at opposite ends of said turning member.

3. In an apparatus of the class described, in combination with a frame having lateral supporting means, an elongated turning member pivotally mounted on said frame, anti-friction rollers mounted at opposite ends of said turning member, means limiting the pivotal movement of said turning member respective to said frame and a reciprocable draft-operated scraper adapted to have lateral engagement with said turning member and to turn therewith during the movement of said scraper about said frame.

4. In an apparatus of the class described, in combination with a reciprocable draft-operated scraper, a frame having lateral supporting means, an elongated turning member having pivotal connection intermediate its ends with said frame, and adapted to afford bearing at one side thereof for said scraper, means adjacent said bearing side for detachably engaging said scraper, and means for automatically disengaging said scraper from said last named means in a predetermined position of the turning member relative to said frame.

5. In an apparatus of the class described, in combination with a reciprocable draft-operated scraper, a frame having lateral supporting means, an elongated turning member having pivotal connection intermediate its ends with said frame, and adapted to afford bearing at one side thereof for said scraper, means adjacent said bearing side for detachably engaging said scraper, and means for automatically disengaging said scraper from said last named means and to lock said turning member in two predetermined positions thereof relative to said frame.

6. In an apparatus of the class described, in combination with a reciprocable draft-operated scraper, a frame having lateral supporting means, an elongated turning member having pivotal connection intermediate its ends with said frame, and adapted to afford bearing at one side thereof for said scraper, a pair of locking arms adapted to extend from said bearing side, means co-acting with said locking arms for automatically locking said arms to include the scraper therebetween, means associated with said last named means adapted to limit the pivotal movement of said turning member and to automatically unlock said arms in two positions of the turning member relative to said frame, each of said arms, upon being unlocked, being movable by the scraper into position to lock the turning member relative to the frame.

7. In an apparatus of the class described, in combination with a reciprocable draft-operated scraper, a frame having lateral supporting means, an elongated turning member pivotally mounted on said frame, a pair of spaced locking arms pivoted on said turning member and adapted to extend into the path of movement of said scraper at one side of the turning member, means operatively connecting said arms together, a pair of rocking members each associated with one of said locking arms and provided with a detent for limiting endwise movement of its respective arm relative to the frame, means on the frame adapted to coact with said rocking members limiting the pivotal movement of said turning member in opposite directions, said rocking members being actuated by said last named means to release its respective arm and afford endwise pivotal movement of the latter out of the path of movement of the scraper, and means on each of said arms adapted to coact with the frame upon endwise pivotal movement thereof to lock the turning member to said frame.

Signed at Chicago, in the county of Cook, and State of Illinois, this 2nd day of February, 1922.

CHARLES E. DAVIS.